Patented Oct. 11, 1938

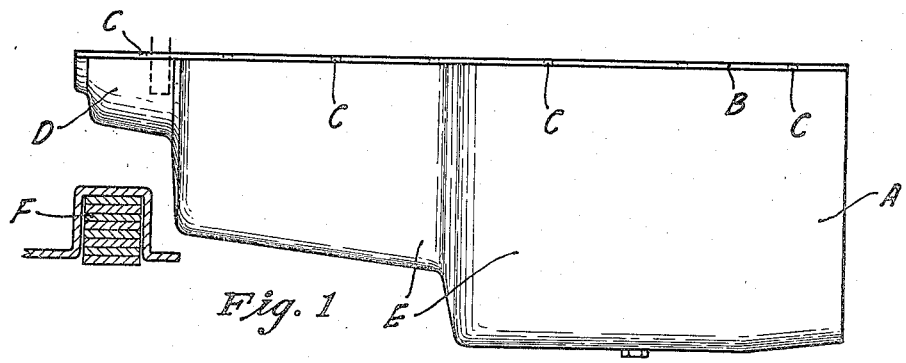
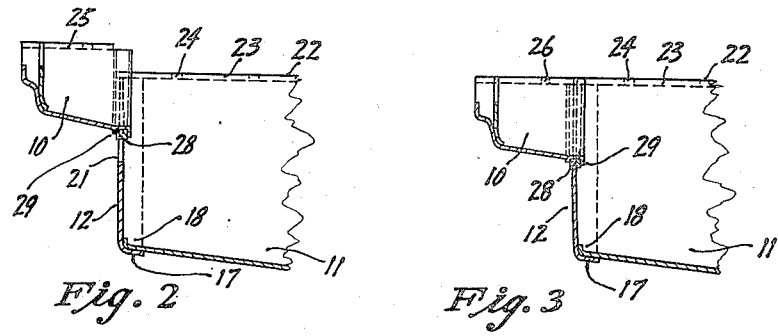
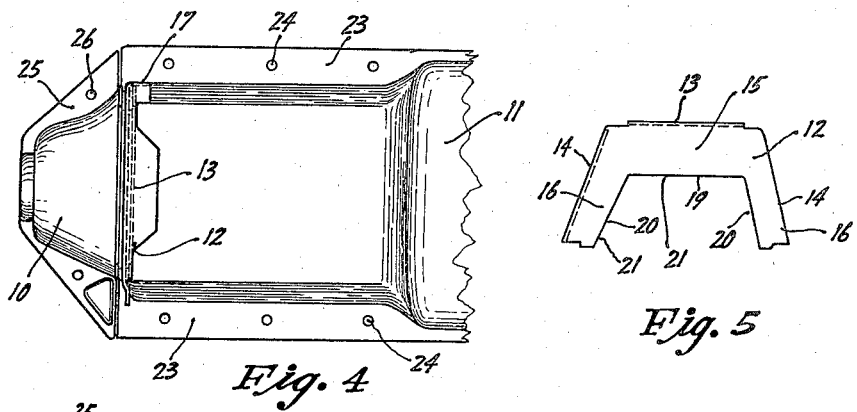
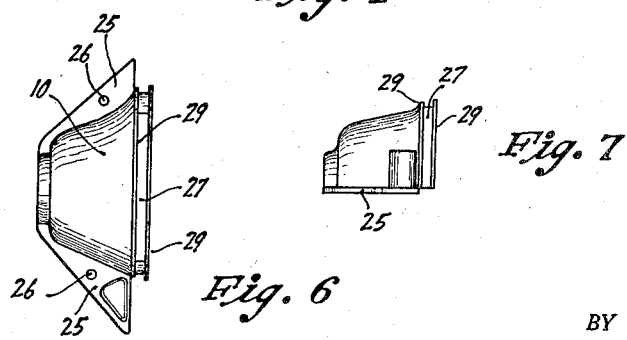

2,132,402

UNITED STATES PATENT OFFICE 2,132,402

OIL PAN FOR CRANKCASES

Emlis B. Curtiss, Litchfield, Minn.

Application May 5, 1937, Serial No. 140,888

7 Claims. (Cl. 121—194)

This invention relates to oil pans for the crankcases of automotive vehicles, and has more especial reference to oil pans for use in connection with the crankcases of automobiles of the type of the Ford V-8.

An object of the invention is to provide an oil pan for crankcases of automotive vehicles which can be removed from and replaced upon a crankcase constructed to receive the oil pan in exceedingly simple and easy manner.

A further object is to provide an oil pan for crankcases of automotive vehicles, particularly for the crankcases of Ford V-8 automobiles, which can be removed from and replaced upon a crankcase adapted to receive the oil pan without necessity for removing or adjusting or altering many of the parts of an automotive vehicle as is now required when removing and/or replacing the oil pans for the crankcases of Ford V-8 cars.

A further object is to provide a new and improved oil pan for crankcases of automotive vehicles which will be of the same general structure as now used on Ford V-8 cars, but which will be of altered construction devised with the end in view of rendering the oil pan capable of being removed from and replaced upon the crankcase of an automobile of the Ford V-8 type without necessity for removing, adjusting, altering, or even considering many of the parts or elements of said automobile as are now required to be considered.

And a further object is to provide an oil pan for crankcases of automotive vehicles wherein will be incorporated improved features and characteristics of construction novel both as individual entities of the oil pan and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a side elevational view of an ordinary oil pan for the crankcase of a Ford V-8 automobile, the view also disclosing, in section, a fixed part of a Ford car beneath the forward end portion of the oil pan and intended to illustrate, in a general way, an obstruction to ready removal of the Ford V-8 oil pan from the crankcase to which said pan is secured;

Fig. 2 is a fragmentary, central, vertical, longitudinal sectional view disclosing a forward portion of an oil pan for automotive vehicle crankcases made according to the invention, detachable or separate entities or parts of the novel and improved oil pan being disclosed as when being assembled or disassembled.

Fig. 3 is a view corresponding generally with the disclosure of Fig. 2, but showing the detachable or separate entities or parts of the novel and improved oil pan assembled as when the pan is in use.

Fig. 4 is a fragmentary bottom plan view of the novel and improved oil pan, disclosing the same end portion of said oil pan as is disclosed in Fig. 3;

Fig. 5 is a plan view of an adapter element or end wall of the oil pan removed therefrom and in inverted position, as said adapter element or end wall would appear when viewed from the left hand side of Fig. 4.

Fig. 6 is a bottom plan view of the relatively small, detachable or separate oil receiving entity or part of the novel and improved oil pan removed from the comparatively large, detachable or separate oil receiving entity or part of said oil pan; and Fig. 7 is a side elevational view of the relatively small entity or part of the oil pan as said relatively small entity or part would appear from the bottom of the sheet in Fig. 6.

In Fig. 1 of the drawing there is disclosed an oil pan A for the crankcase of an ordinary Ford V-8 automobile, said oil pan including an upper flange B with openings C for receiving, in customary manner, bolts (not shown) adapted to enter a crankcase (not shown) above the oil pan and to securely and rigidly fasten said flange up against said crankcase.

For the purpose of descriptive illustration the oil pan A may be said to consist of a forward, relatively small oil receiving entity or part D at the front end of the oil pan, and a rearward, comparatively large oil receiving entity or part E to the rear of said entity or part D. The entities or parts D and E are integrally connected. That is, the oil pan A is a one piece or unitary structure. The comparatively large oil receiving entity or part E is adapted to receive the crank shaft (not shown) of an automotive vehicle and the main body portion of the oil in which said crank shaft is rotatable. The relatively small oil receiving entity or part D is adapted to receive a bearing for the crank shaft and, of course, some of the oil.

In said Fig. 1 an obstruction to ready removal of an oil pan from the crankcase of a Ford V-8 automobile is designated F, said obstruction F being an ordinary part of the automotive vehicle equipment and extending transversely of the frame of the automobile at location just below and directly beneath and adjacent to the relatively small oil receiving entity or part D of the oil pan A. The obstruction F, together with other obstructions not disclosed, renders it quite difficult to remove an oil pan such as A from the crankcase of a Ford V-8 automobile because of the fact that when attempt is made to remove the larger, or rear, portion E of the oil pan by movement of said portion E downwardly away from the crank case, the smaller, or front, portion D of said oil pan is confined by the obstruction F, as well as by other obstructions upon the car. Suffice it to say that to remove the oil pan as now ordinarily constructed from the crankcase of a Ford V-8 automobile it is necessary, speaking generally, to release the front motor supports, remove the four radiator hoses from the motor or radiator, remove the front splash pan, remove the crank shaft pulley, place a special jack upon the front cross member of the frame, insert the jack in the adjacent end portion of the crank shaft, and raise the front end of the motor some seven inches, more or less, to provide space for removal of the oil pan, especially the front end portion, entity or part D thereof.

The oil pan of the invention has been devised so that it can be removed from and replaced upon the crankcase of a Ford V-8 automobile without necessity for many labor costs as are now required to remove and replace Ford oil pans, the oil pan herein disclosed being removable from and replaceable upon an automobile crankcase of the general type of the crankcase of a Ford V-8 car without the necessity for making any of the adjustments or alterations as set forth in the preceding paragraph, and without the necessity of removing, adjusting or altering much of the equipment and many of the elements of an automotive vehicle from which the novel and improved oil pan is to be removed or upon which said oil pan of the invention is to be replaced. Also, the improved oil pan here presented requires and utilizes no space in addition to that now taken up by an oil pan such as A disclosed in Fig. 1 of the drawing.

The novel and improved oil pan is very clearly disclosed in Figs. 2 to 6. As there shown, a relatively small, detachable or separate oil receiving entity or part 10 of the oil pan corresponds to and accomplishes the same functions and purposes as does the relatively small oil receiving entity or part D of the oil pan A of Fig. 1, and a comparatively large, detachable or separate oil receiving entity or part 11 corresponds to and accomplishes the same functions and purposes as does the comparatively large oil receiving entity or part E of said oil pan A.

An adapter element 12 constitutes a front end wall of the comparatively large, detachable or separate oil receiving entity or part 11. As disclosed, said adapter element or end wall 12 consists of a generally V-shape or U-shape piece, blank or plate of material which may be sheet metal. The outer margins, represented 13 and 14, of the base 15 and the legs 16, respectively, of said adapter element or end wall 12 are fitted about and welded or otherwise secured, as at 17, to the forward, marginal end portion 18 of said comparatively large, detachable or separate oil receiving entity or part 11. The inner margins, denoted 19 and 20, of said base 15 and said legs 16, respectively, together provide a generally V-shape or U-shape seat, itself denoted 21, in spaced relation to and surrounded by said forward, marginal end portion 18 of the entity or part 11. The generally V-shape or U-shape seat 21 is at location below the upper margin 22 of said entity or part 11. Said upper margin 22 includes flanges 23, equivalent to the flange B upon the entity or part E, and bolt holes 24, equivalent to the bolt holes C in said flange B. Of course the entity or part 11 and the seat 21 of the adapter element or end wall 12 are open at their upper sides, as will be apparent.

The upper margin of the relatively small, detachable or separate oil receiving entity or part 10 includes flanges 25, equivalent to the flange B upon the entity or part D, and bolt holes 26, equivalent to the bolt holes C in the flange B of said entity or part D. Said entity or part 10 is also open at its upper side.

The rearward portion of the lower side or surface of the relatively small, detachable or separate oil receiving entity or part 10 is of shape and size, as indicated at 27, to be fitted to the seat 21 of the adapter element or end wall 12 when both of the entities or parts 10 and 11 are fitted up against and secured to a crankcase for the oil pan which said entities or parts 10 and 11 and said adapter element or end wall 12 together provide. That is to say, the rearward portion of the lower surface of the relatively small, detachable or separate oil receiving entity or part 10 is of shape and size to provide a circumferentially extending, male or generally convex seat 27 which will be snugly fitted into and up against the female or generally concave seat 21 of the adapter element or end wall 12 when the flanges 25 and 23 of the entities or parts 10 and 11 are fitted up against and secured to a crankcase.

Numeral 28 represents a gasket disposed between the seats 21 and 27 for precluding the possibility of leakage of oil past said seats when the oil pan is in operative or working position upon a crankcase. The gasket 28 may consist of cork, or of any other suitable material. The relatively small entity or part 10 includes spaced apart, circumferentially extending ribs or ridges 29 at the opposite sides of the seat 27 for the purpose of retaining the gasket 28 in its intended position, especially when said seat 27 is removed from the seat 21 and the entities or parts 10 and 11 are disassembled.

In practice, the relatively small, detachable or separate oil receiving entity or part 10 can be first secured up against a crankcase. Thereafter, the comparatively large, detachable or separate oil receiving entity or part 11, with adapter element or end wall 12 welded or otherwise applied thereto in fluid-tight manner, can be secured up against said crankcase after the fashion as suggested in Fig. 2 and so that the seats 21 and 27 with gasket 28 therebetween are in assembled engagement as in Fig. 3. Obviously, when said seats 21 and 27 are in proper engagement with opposed surfaces of said gasket 28 there will be no possibility of leakage of oil from the oil pan. In removing the oil pan, the entity or part 11 will be removed first. The entity or part 10 will or will not in some particular instance be removed, depending upon a repairing job to be accomplished.

It will be evident that an oil pan as in Fig. 1 of the drawing can be made over into an oil pan as in Figs. 2 to 6 in very simple, economical and easy manner. All that is necessary to produce the oil pan of said Figs. 2 to 6 by utilization of the material of the oil pan A of said Fig. 1 is to cut off the entity or part D from the entity or part E, possibly by use of a blow torch, trim away a portion of the cut-off end of said entity or part D and/or a portion of the cut-off end of said entity or part E, weld or otherwise fasten an adapter element or end wall such as 12 to or about the margin of said cut-off end of the entity or part E, which has become the entity or part 11, and prepare the rearward portion of the lower surface of the entity or part D, which has become the entity or part 10, to produce the seat 27 for fitting to the seat 21. The preparation of the seat 27 will of course include the provision of the spaced apart, circumferentially extending ribs or ridges 29 at the opposite sides of said seat 27 for retaining the gasket 28. The operations necessary to convert the oil pan of Fig. 1 into the oil pan of Figs. 2 to 6 are all of simple character and can be readily performed in any ordinary garage.

By constructing the novel and improved oil pan in detachable or separate entities or parts, all of the difficulties encountered in removing an oil pan from and replacing it upon the crankcase of an automobile of the general type of the Ford V-8 are eliminated. The relatively small oil receiving entity or part 10 and the comparatively large oil receiving entity or part 11 can each be separately removed and replaced without interference from any part or equipment of the automotive vehicle. During the performance of most repair jobs the relatively small entity or part 10 need not be removed from the crankcase.

What is claimed is:

1. An oil pan for a crankcase of an automotive vehicle, comprising a plurality of separate oil receiving entities in open communication with each other, and means for independently securing each of said oil receiving entities up against said crank case, a wall of one of said oil receiving entities being constructed to provide an upwardly facing seat, and a lower surface of an oil receiving entity adjacent to said upwardly facing seat being constructed to provide a downwardly facing seat adapted to be assembled with said upwardly facing seat to provide a fluid-tight joint between adjacent oil receiving entities of said oil pan.

2. An oil pan for a crankcase of an automotive vehicle, comprising a plurality of separate, cooperating oil receiving entities in open communication with each other, means for independently securing each of said oil receiving entities up against said crank case, and a fluid-tight joint between adjacent oil receiving entities of said oil pan, said fluid-tight joint consisting of an upwardly facing seat provided by a wall of one of said oil receiving entities, a downwardly facing seat provided by another of said oil receiving entities adjacent the oil receiving entity having said upwardly facing seat, and a gasket between said upwardly and downwardly facing seats, said seats, respectively, being engaged with opposed surfaces of said gasket.

3. An oil pan for a crankcase of an automotive vehicle, comprising a plurality of separate, cooperating oil receiving entities in open communication with each other, means for independently securing each of said oil receiving entities to said crank case, and a fluid-tight joint between adjacent oil receiving entities of said oil pan, said fluid-tight joint being constituted by a wall of one of said oil receiving entities providing an upwardly facing, transversely extending, elongated seat below the upper margin of said wall, a downwardly facing, transversely extending, elongated seat provided by a lower surface of another of said oil receiving entities adjacent to the oil receiving entity having said upwardly facing seat, and a gasket between said upwardly and downwardly facing seats, opposed surfaces of said gasket being engaged by said seats.

4. The combination as specified in claim 3, wherein said upwardly and downwardly facing seats are of general U-shape.

5. An oil pan for a crankcase of an automotive vehicle, comprising a plurality of separate oil receiving entities in open communication with each other, including a relatively small oil receiving entity at the forward portion of said oil pan and a comparatively large oil receiving entity at the rear of said relatively small oil receiving entity, means for independently securing each of said oil receiving entities up against said crank case, and a fluid-tight joint between said relatively small and said comparatively large oil receiving entities, said fluid-tight joint consisting of an upwardly facing seat provided by an adapter element wall of said comparatively large oil receiving entity, a downwardly facing seat provided by said relatively small oil receiving entity, and a gasket between said upwardly and downwardly facing seats, opposed surfaces of said gasket being engaged by said seats.

6. The combination as specified in claim 5, wherein said upwardly and downwardly facing seats are of general U-shape, and said downwardly facing seat is upon a lower surface of said relatively small oil receiving entity.

7. An oil pan for a crankcase of an automotive vehicle, comprising a plurality of separate oil receiving entities in open communication with each other, including a relatively small oil receiving entity and a comparatively large oil receiving entity, means for independently securing each of said oil receiving entities up against said crank case, an adapter element constituting a wall of said comparatively large oil receiving entity and providing an upwardly facing seat below the upper marginal portion of said oil pan, a downwardly facing seat provided by an end portion of said relatively small oil receiving entity, and a gasket between said seats, said upwardly facing and said downwardly facing seats being engaged with opposed surfaces of said gasket to provide a fluid-tight joint between said comparatively large and said relatively small oil receiving entities.

EMLIS B. CURTISS.